March 16, 1954  C. J. H. HALLENDORFF  2,672,049
DEVICE FOR MEASURING ROUGHNESS OF SURFACES
Filed June 14, 1949  2 Sheets-Sheet 1
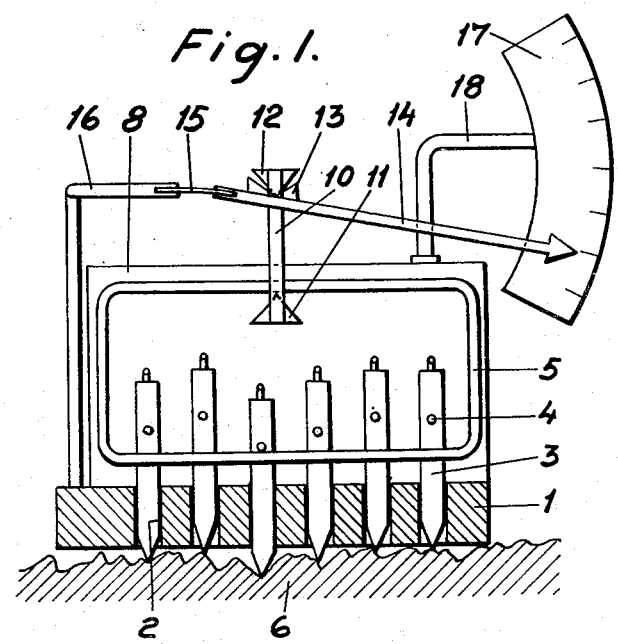
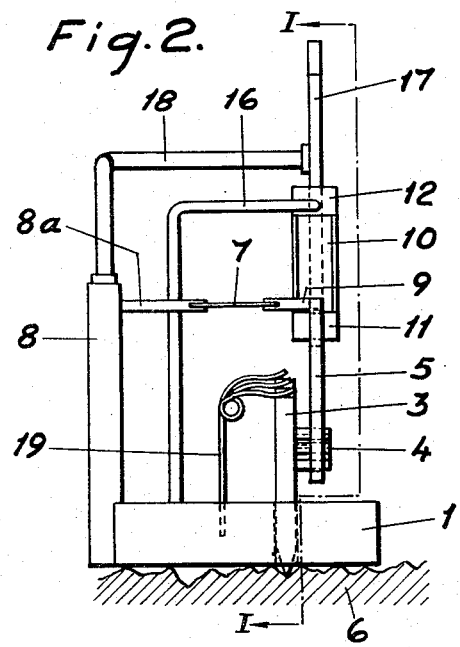
INVENTOR
Carl J. H. Hallendorff
By Darby & Darby
ATTORNEYS March 16, 1954 C. J. H. HALLENDORFF 2,672,049
DEVICE FOR MEASURING ROUGHNESS OF SURFACES
Filed June 14, 1949 2 Sheets-Sheet 2

INVENTOR
CARL J. H. HALLENDORFF
BY
ATTORNEYS

Patented Mar. 16, 1954

2,672,049

UNITED STATES PATENT OFFICE 2,672,049

DEVICE FOR MEASURING ROUGHNESS OF SURFACES

Carl Johan Herman Hallendorff, Bromma, Stockholm, Sweden

Application June 14, 1949, Serial No. 99,056

8 Claims. (Cl. 73—105)

In for example the mechanical industry there exists a great need of measuring devices for measuring the roughness of surfaces on machined parts. According to Swedish Standard Specifications the roughness of surfaces is defined as the mean peak to valley value obtained from measurements made on a part of the surface, the dimensions of the latter being specified according to the Standards.

Among other instruments employed for measuring the surface profile depth—peak to valley value—there are instruments provided with a needle which in different manners can be traced along the surface to be tested, the needle point following the surface while an indicating system connected to the needle enables the operator to read the resulting longitudinal amplitudes of the needle perpendicular to the surface.

Such types of devices all suffer from the disadvantage that surfaces of soft materials easily become worn and scratched as a result of testing. Whenever extra fine needles are used for the purpose of examining the finest scratches in the surface the risk that the needle will be broken by lateral forces is ever present.

In principle the measurements of surface finish can be accomplished by way of measuring the distance between one plane contacting the peaks of the surface irregularities and another imagined plane located through the troughs of the surface irregularities. The first mentioned plane can in principle be established by means of a measuring member (or members) with a certain lateral extension which is put into contact with the surface proper, the contact taking place only at the peak spots of said surface.

In order to establish the plane going through the troughs of the surface irregularities, known instruments are equipped with a needle by means of which a number of points on the surface are successively tested in moving the needle from point to point.

This manner of testing puts great demands on the strength of the needle and unless special registering systems are employed, such systems usually being complicated and expensive, this method of work is rather tedious and slow.

An object of this invention is to provide a measuring device in which the location of the plane through the troughs of the surface irregularities is determined by means of a number of pointed needles, arranged side by side in one or more rows, the needles being urged against the surface by, for example, their own weight or by spring pressure, the position of the needle having the deepest penetration being by means of a transverse pin, arranged on the needle transmitted to a transversal arm or the like, an indicating system giving the distance between the abovementioned measuring member or members and said arm whereby the measurement of the peak to valley value of the surface can be read without moving the needle along the surface.

An embodiment of this invention is shown in the attached drawing.

In the drawing:

Fig. 1 shows a front view elevation of a measuring device according to this invention, the view being partly in section as indicated by the line 1—1 of Figure 2;

Fig. 2 is an end view of the device of Figure 1;

Figure 3 is a front elevational view partly in section on the plane of line 3—3 of Figure 4 showing another embodiment of the invention; and Figure 4 is an end view of the modification of the device illustrated in Figure 3.

With reference to the drawing I designates a plate serving as a measuring member for defining the plane going through the peaks of the surface irregularities. Plate I has one or more rows of vertical holes at equal distances apart, the walls 2 of which serve as guides for a corresponding number of pointed needles 3 which are slidably mounted in the holes. Each needle 3 is provided with a transverse pin 4 cooperating with a frame 5 the lower horizontal member of which is contacting the pin of the needle or needles having the greatest penetration of the surface of the piece 6 being tested. This will result in the pin or pins of this particular needle or those particular needles pulling the frame downwards.

The frame 5 is suspended preferably by means of leaf springs 7 fixed in suitable supports 8a on a back plate 8 attached to the plate I and connected to the frame by other suitable members 9. At least two such springs 7 ought to be provided in order to ensure a substantially parallel guiding of the frame.

Attached to the upper horizontal member of the frame 5 is a suspension rod 10, which at its lower and upper end is provided with edge members 11, 12. The lower edge member engages the upper horizontal member of frame 5 while the upper edge engages a cooperating member 13 fixed to a pointer 14, said pointer being at one end supported by a leaf spring 15 which at its other end is supported by a suitable support 16 and the other end of the pointer cooperating with a graduated scale 17, by means of a suitable member 18 fixed to the back plate 8.

Springs 19 are with one end fixed in plate I while the other end is engaging the upper end of needles 3 thus urging the latter against the surface being tested. The concerted effects of plate 1 resting on the top of the surface peaks and the needle with the greatest penetration determining the plane going through the troughs of the surface irregularities will permit a reading on the scale 17 of the peak to valley value of the surface.

In a modified embodiment of this invention one group of needles 3 cooperates with one frame 5 and another group of needles 3 with another frame, one group of needles being used to locate the projected plane going through the troughs of the surface irregularities and the other group of needles locating the plane contacting the peaks of the surface. The frames are cooperating with an indicating system giving the differences in height between the two planes.

Such a modification is shown in Figs. 3 and 4. The general arrangement of the structure is the same as in the device according to Figs. 1 and 2, the essential difference being that the needles 3 are used here also for locating the peaks of the surface. The plate 1 serves only to support the device. Two frames, 5 and 5a respectively are used for cooperation with the projections 4 of the needles, the lower member of frame 5a engaging the upper side of the projections 4. Thus the frame 5a will establish the position of the needle 3 having the least penetration and frame 5 as in the former embodiment the position of the needle 3 with the greatest penetration. Both frames are suspended in leaf springs 7 and 7a respectively from the common support 8; the springs for the frame 5a are preferably given a certain pre-load in the opposite direction against the springs supporting frame 5 in order to keep frame 5a into engagement with the projections 4. The pointer 14 is suspended between the frames to indicate their relative positions, for example as illustrated, where each of frames 5 and 5a are provided with a laterally extending pin 20 and 21 respectively, engaging the pointer which has a circular hole 22 and an elongated slot 23 to cooperate with said pins, the scale 17 being provided for reading the recordings. As the system of transmitting the readings from the frames to the scale is no object of this invention any other suitable means can be adopted.

When using the device for measuring surface roughness one or more needles will sense the deepest depressions in the surface while one or more needles adjust themselves to the highest peaks, the needle in the highest and lowest position respectively giving the peak to valley value of the surface being tested, each of these needles being thus representative of two groups, one defining the peaks of the surface and the other the valleys.

As various possible embodiments might be made of the above invention and as various changes might be made in the embodiment set forth it is to be understood that all matter herein contained or shown in the accompanying drawing is to be interpreted as illustrative and not in a limiting sense.

Having now described my invention I claim as new and desire to secure by Letters Patent:

1. A device for measuring roughness of surfaces, comprising, a base member having a flat bearing face adapted to rest against the surface to be tested, there being a plurality of bores in said member extending perpendicularly to said bearing face, a pointed needle in each said bore guided for longitudinal displacement therein and adapted to rest with its point against the surface to be tested, a motion transmitting member on each needle, and common indicating means engageable by said motion transmitting members to indicate the distance between the point of the needle having the greatest penetration and said flat bearing surface.

2. In a device of the class described, in combination, a base member with a flat bearing face adapted to rest against the surface to be tested, there being a plurality of bores in said member extending perpendicularly to said bearing face, a pointed needle guided for longitudinal displacement in each said bore, spring means urging each needle downwardly to keep the point thereof in contact with the surface, a lateral projection on each needle at the same distance from the point for all needles, a frame-shaped member extending generally parallel to said flat bearing face, means resiliently suspending said frame member above the base member in position for engagement of its lower arm with the projection of the needle having the greatest penetration, and indicating means connected to the frame member for indicating the distance between the bearing face of the base member and the point of that needle having the greatest penetration.

3. A device of the class described, in combination, a base member having a flat bearing face adapted to rest against the surface to be tested, there being a plurality of bores in said base member extending perpendicularly to said bearing face, a pointed needle guided for longitudinal displacement in each said bore, spring means urging each needle point into contact with the tested surface, a lateral projection on each needle at the same distance from the point for all needles, a generally rectangular frame member, said frame member being suspended by at least two leaf springs attached to the upper portion thereof, said springs being secured to a supporting structure fixed to the base member, the lower member of said frame being adapted to engage said projections to be displaced thereby, a pointer member resiliently suspended from a supporting member secured to said base member, an operating connection between said frame member and said pointer member to transmit the positions of the frame member to the pointer member, and a scale member supported by said supporting structure and adapted to establish the positions of said pointer member.

4. In a device of the class described, in combination, a base member having a flat bearing face adapted to rest against a surface to be tested, there being a plurality of bores in said base member extending perpendicularly to said bearing face, a pointed needle guided along part of its length for longitudinal displacement in each said bore, each needle having a spring one end of which is secured to the base member and the other end of which engages the needle to urge the needle point into working contact with the surface to be tested, a lateral projection on each needle at the same distance from the point for all needles, a rectangular frame, said frame being suspended by its upper member from the ends of two leaf springs, a plate member to which the other ends of said springs are secured, said plate member being fixed to the said base member and extending perpendicularly thereto, the lower member of said frame being positioned to be engaged by said projection or projections of the needle or needles having the greatest penetration, a supporting arm fixed to said base member, a leaf spring secured to the end of said arm, a pointer suspended at the free end of said leaf spring, a link connection between said pointer and the upper member of said frame to transmit the displacement of the frame to said pointer, and a graduated scale supported by said plate member and located behind said pointer for indicating the position of the latter.

5. In a device of the class described, in combination, a base member having a flat bearing face adapted to rest against a surface to be tested, there being a plurality of bores in said member extending perpendicularly to said bearing face, a pointed needle guided for longitudinal displacement in each said bore, spring means urging each needle point into contact with the tested surface, a lateral projection on each needle, said projections being at the same distance from the point in all needles, two frame-shaped members, means resiliently suspending said frame members from the base member for cooperation between their lower members and said projections, the lower member of one of said frames engaging the top of the projection on the needle with the least penetration and the lower member of the other of said frames engaging the bottom of the projection on the needle with the deepest penetration, and indicating means for establishing the relative position between said frames and thereby indicating the peak to valley value of the surface tested.

6. In a device of the class described, in combination, a base member with a flat bearing face adapted to rest against the surface to be tested, there being a plurality of bores extending perpendicularly to said bearing face, a pointed needle guided along part of its length for longitudinal displacement in each said bore, a spring having one end secured to the base member and the other end engaging each said needle to urge the needle point into working contact with a surface to be tested, a lateral projection on each needle, said projections being at the same distance from the point for all needles, two rectangular frames, means suspending said frames, one suspended within the other, said means comprising two leaf springs for each frame, said springs being secured to the upper members of said frames, a plate member to which said springs are secured at their other ends, said plate member being fixed to said base member and extending perpendicularly thereto, the lower members of said frames being positioned to engage the upper side of the projection of the needle having the least penetration and the under side of the projection of the needle having the greatest penetration respectively, a pin member secured laterally to each upper member of said frames, a pointer having a hole and an elongated slot respectiveley, engaging said pin members to establish the relative position between the frames, and a scale supported by said plate member and located behind said pointer for indicating the position of the latter and establishing the difference in height between the needle point having the greatest penetration and the one having the least penetration.

7. A device for measuring roughness of surfaces, comprising, a base member having a portion adapted to rest against the surface to be tested, a plurality of pointed needles arranged side by side in a single row and guided for individual displacement perpendicularly of said portion of said base member, said needles being adapted to rest with their pointed ends against the surface to be tested, resilient means urging the needles against said surface, and common indicating means engageable by the needle having the deepest penetration into the surface to be tested to indicate the distance between the point of said last mentioned needle and the surface of said portion of said base member.

8. A device for measuring roughness of surfaces, comprising, a base member having a portion adapted to rest against the surface to be tested, a plurality of pointed needles arranged side by side in a single row and guided for individual displacement perpendicularly of said portion of said base member, said needles being adapted to rest with their pointed ends against the surface to be tested, resilient means urging the needles against said surface, and common indicating means engageable by the needle having the least penetration and the one having the greatest penetration into the surface to be tested to indicate the distance between the points of said needles.

CARL JOHAN HERMAN HALLENDORFF.

References Cited in the file of this patent

UNITED STATES PATENTS

| Number | Name | Date |
|---|---|---|
| 899,224 | Haas | June 2, 1908 |
| 1,041,145 | Moss | Oct. 15, 1912 |
| 2,045,176 | Bush | June 23, 1936 |
| 2,177,051 | Birmingham | Oct. 24, 1939 |
| 2,253,992 | Verduzco | Aug. 26, 1941 |
| 2,417,148 | Wright | Mar. 11, 1947 |
| 2,437,679 | Burgess | Mar. 16, 1948 |
| 2,460,726 | Arndt | Feb. 1, 1949 |
| 2,474,015 | Shaw | June 21, 1949 |

FOREIGN PATENTS

| Number | Country | Date |
|---|---|---|
| 559,622 | Great Britain | Feb. 28, 1944 |